(No Model.)

W. S. DOWNING.
COMBINED FEED RACK AND MANGER.

No. 310,261. Patented Jan. 6, 1885.

Witnesses,
Geo. H. Strong.
J. H. Krouse

Inventor,
W. S. Downing
By Dewey & Co.
Attorneys

N. PETERS. Photo-Lithographer, Washington, D. C.

UNITED STATES PATENT OFFICE.

WILLIAM S. DOWNING, OF HALF MOON BAY, ASSIGNOR OF ONE-HALF TO GEORGE H. WALKER, OF SAN FRANCISCO, CALIFORNIA.

COMBINED FEED RACK AND MANGER.

SPECIFICATION forming part of Letters Patent No. 310,261, dated January 6, 1885.

Application filed May 5, 1884. (No model.)

*To all whom it may concern:*

Be it known that I, WILLIAM S. DOWNING, of Half Moon Bay, county of San Mateo, and State of California, have invented an Improvement in a Combined Feed Rack and Manger; and I hereby declare the following to be a full, clear, and exact description thereof.

My invention relates to combined feed racks and mangers; and it consists in the peculiar construction and arrangement of devices, all of which I shall hereinafter more fully describe by reference to the accompanying drawings, in which—

Figure 1:
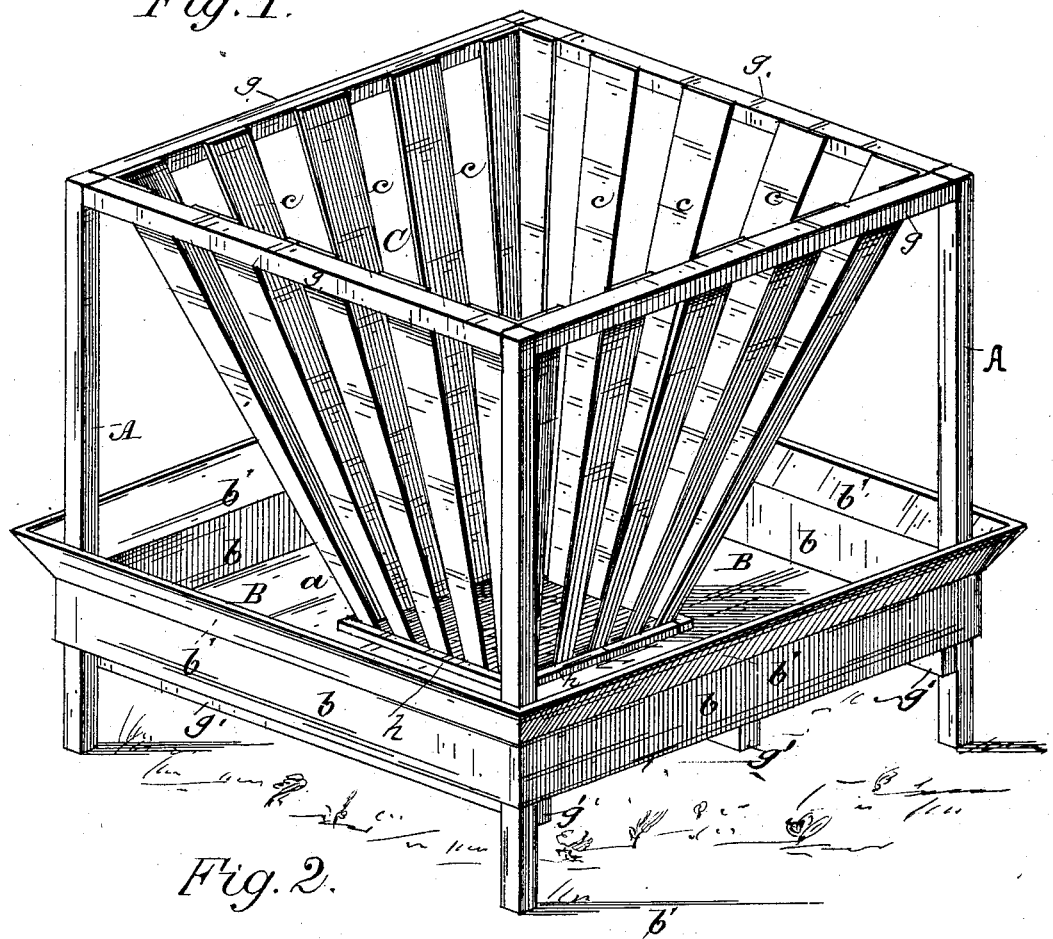
Figure 2:
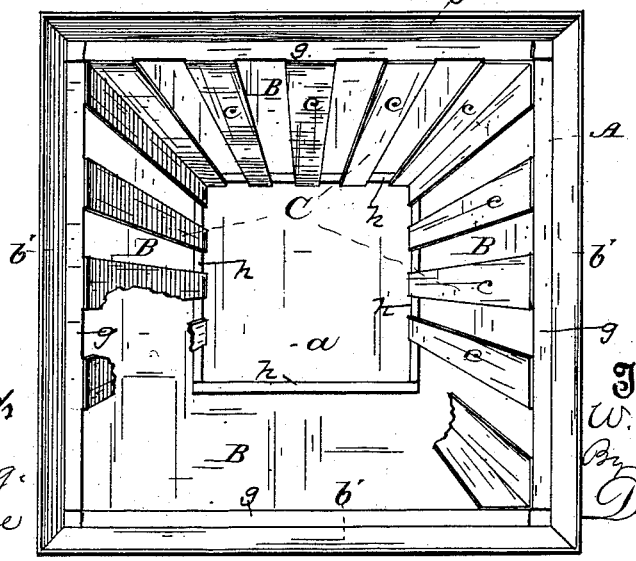

Figure 1 is a perspective view of my feed rack and manger. Fig. 2 is a plan of the same, portions of the slats being broken away.

The feed rack or manger is a square upright frame consisting of four corner posts, A, connected at the top by cross-pieces $g$, properly tenoned or nailed to said posts. At a proper distance from the bottom of said posts cross-pieces $g'$ are nailed, or otherwise fastened, to form a support for a floor, $a$, laid thereon. On the floor thus laid strips $h$ are nailed in the form of a square, and to said strips and cross-pieces $g$ upwardly-extending slats $c$ are secured, forming the rack C. Around the posts A a siding, $b$, having a flaring top or rim, $b'$, is nailed, or otherwise fastened, the lower edge of said siding being on a line with the lower side of the floor $a$, forming the manger B. The hay or other food is placed in the rack. This rack and manger is intended principally for outside use, and may of course be provided with a rough roof for inclement weather; or it may be placed under permanent cover, provided sufficient space be left for reaching it from all sides. Its principal advantage is the facility it affords for reaching it and the number of animals which can feed from it at one time. Instead of having, as is usually the case with stall-racks, but one side at which the animals may feed, it has four sides, and a number of cattle may approach and feed from it at once. Its great capacity is another advantage, for, being intended for outside use, it can be made sufficiently large to hold a great quantity of hay—say half a ton, or more—without being too cumbersome, as all the available space is utilized. The top of the surrounding manger, it will be seen, projects beyond the vertical plane of the top of the sides of the rack, and therefore in pulling out the hay, whatever portion is dropped falls into the manger, instead of on the ground. Thus none of the feed is lost. This rack is suitable also for feeding vegetables to cattle, and it is high enough to be out of the way of hogs. Being outside, horses, when harnessed to a vehicle, can be driven up to it to feed without having the trouble of unhitching them.

I am aware of Patents Nos. 62,552, of 1867, 247,917, of 1881, and 263,876, of 1882, and do not claim the features and construction therein shown and described.

Having thus described my invention, what I claim as new, and desire to secure by Letters Patent, is—

A feed rack and manger consisting of the corner posts, A, with cross-pieces $g$ and $g'$ at top and bottom, the floor $a$, the strips $h$, nailed or otherwise fastened to said floor, upwardly-flaring slats $c$, secured to the cross-pieces $g$ and strips $h$, and the siding $b$, having the flaring top or rim $b'$, substantially as herein described.

In witness whereof I have hereunto set my hand.

WILLIAM S. DOWNING.

Witnesses:
WILLIAM PRINGLE,
J. H. MANSFIELD.